United States Patent
Park et al.

(10) Patent No.: US 12,389,453 B2
(45) Date of Patent: Aug. 12, 2025

(54) PACKET COLLISION MITIGATION IN SIDELINK

(71) Applicant: QUALCOMM Incorporated, San Diego, CA (US)

(72) Inventors: Cheol Hee Park, San Diego, CA (US); Ralph Akram Gholmieh, San Diego, CA (US); Feng Chen, Beijing (CN); Jintao Hou, Beijing (CN); Hamza Ijaz Abbasi, San Diego, CA (US); Giridhar Ramakrishnan, San Diego, CA (US)

(*) Notice: Subject to any disclaimer, the term of this patent is extended or adjusted under 35 U.S.C. 154(b) by 299 days.

(21) Appl. No.: 17/759,961

(22) PCT Filed: Mar. 16, 2020

(86) PCT No.: PCT/CN2020/079541
§ 371 (c)(1),
(2) Date: Aug. 2, 2022

(87) PCT Pub. No.: WO2021/184168
PCT Pub. Date: Sep. 23, 2021

(65) Prior Publication Data
US 2023/0060746 A1    Mar. 2, 2023

(51) Int. Cl.
*H04W 74/0816* (2024.01)

(52) U.S. Cl.
CPC .............. *H04W 74/0816* (2013.01)

(58) Field of Classification Search
CPC ......... H04W 74/0816; H04W 28/0236; H04W 28/0289; H04W 72/11; H04W 72/40
See application file for complete search history.

(56) References Cited

U.S. PATENT DOCUMENTS

| 10,652,879 B2* | 5/2020 | Rico Alvarino ........ H04W 4/70 |
| 2011/0085455 A1 | 4/2011 | Wu et al. |

(Continued)

FOREIGN PATENT DOCUMENTS

| CN | 109698726 A | 4/2019 |
| EP | 3866547 A1 | 8/2021 |

(Continued)

OTHER PUBLICATIONS

Jaffry S., et al., "D2D Neighborhood Discovery by a Mobile Device", IEEE, Department of Mechanical and Electrical Engineering, International Conference on Communications (ICC), XP033582395, May 20, 2019, 6 Pages.

(Continued)

*Primary Examiner* — Yu-Wen Chang

(57) ABSTRACT

Certain aspects of the present disclosure provide techniques for collision mitigation in sidelink. A method that may be performed by a user equipment (UE) includes measuring channel busy ratio (CBR), estimating a number of UEs using the channel, estimating a congestion level based on the CBR and the estimated number of UEs. A method that may be performed by a sidelink UE includes determining a semi-persistent scheduling (SPS) resource reservation including first subframes, determining second subframes for generated packet transmission, determining to skip transmission in the second subframes, listening during the second subframes for another sidelink UE's transmission, and determining whether to reselect resources. Another method includes listening during a first subframe for another sidelink UE's transmission, detecting the transmission collides with a scheduled transmission resource for the sidelink UE based on an amount of frequency resource overlap, and determining to reselect resources.

27 Claims, 14 Drawing Sheets

(56) References Cited

U.S. PATENT DOCUMENTS

| | | | |
|---|---|---|---|
| 2017/0188391 A1 | 6/2017 | Rajagopal et al. | |
| 2019/0342893 A1 | 11/2019 | Zhao et al. | |
| 2020/0196345 A1* | 6/2020 | Gupta | H04W 16/14 |
| 2024/0032052 A1* | 1/2024 | Babaei | H04W 72/23 |
| 2024/0057211 A1* | 2/2024 | Palenius | H04W 72/25 |

FOREIGN PATENT DOCUMENTS

| | | |
|---|---|---|
| WO | 2017135998 A1 | 8/2017 |
| WO | 2017196104 A1 | 11/2017 |
| WO | 2019032035 A1 | 2/2019 |
| WO | 2020033381 A1 | 2/2020 |

OTHER PUBLICATIONS

Intel Corporation: "Sidelink Resource Allocation Mode-2 Design for NR V2X Communication," 3GPP TSG RAN WG1 Meeting #97, R1-1906796, Intel—EV2X SL M2, 3rd Generation Partnership Project, Mobile Competence Centre, 650, Route Des Lucioles, F-06921, Sophia-Antipolis Cedex, France, vol. RAN WG1, No. Reno, USA, May 13, 2019-May 17, 2019, May 13, 2019, 18 pages, XP051728247, paragraph [2.11].

Supplementary European Search Report—EP20925229—Search Authority—The Hague—Jan. 23, 2024.

CATT: "Remaining Issues on Mode 2 Resource Allocation in NR V2X", 3GPP Draft, 3GPP TSG RAN WG1 #100, R1-2000522, e-Meeting, Feb. 24-Mar. 6, 2020, Mar. 6, 2020 (Mar. 6, 2020), 15 Pages, Section 2.1.

Ericsson: "Congestion Control for NR Sidelink", 3GPP TSG-RAN WG1 Meeting #98bis, R1-1910539, Chongqing, China, Oct. 14-20, 2019, Oct. 20, 2019 (Oct. 20, 2019), 6 Pages, XP051789343, Retrieved from the Internet: URL: http://www.3gpp.org/ftp/tsg_ran/WG1_RL1/TSGR1_98b/Docs/R1-1910539.zip [Retrieved on Oct. 7, 2019] p. 3, lines 22-25 Section 2.2, Section 2.1.

International Search Report and Written Opinion—PCT/CN2020/079541—ISAEPO—Dec. 16, 2020.

Samsung: "Discussion on Skipped Subframe Handling for Partial Sensing", 3GPP TSG RAN WG1 #89, R1-1707868, Hangzhou, China, May 15-19, 2017, May 6, 2017, 2 Pages.

* cited by examiner

PACKET COLLISION MITIGATION IN SIDELINK

CROSS-REFERENCE OF RELATED APPLICATION(S)

This application is a national stage application under 35 U.S.C. 371 which claims benefit of and priority to International Application No. PCT/CN2020/079541, filed Mar. 16, 2020, which is hereby assigned to the assignee hereof, and hereby expressly incorporated by reference herein in its entirety as if fully set forth below and for all applicable purposes.

BACKGROUND

Field of the Disclosure

Aspects of the present disclosure relate to wireless communications, and more particularly, to techniques for packets collision mitigation in sidelink, such us for avoiding or reducing UE-to-UE collisions in cellular vehicle-to-anything (C-V2X) systems.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved packet collision mitigation.

Certain aspects of the subject matter described in this disclosure can be implemented in a method for wireless communication by a user equipment (UE). The method generally includes measuring a channel busy ratio (CBR). The method generally includes estimating a number of UEs using the channel. The method generally includes estimating a congestion level based on the CBR and the estimated number of UEs.

Certain aspects of the subject matter described in this disclosure can be implemented in a method for wireless communication by a sidelink user equipment (UE). The method generally includes determining a semi-persistent scheduling (SPS) resource reservation comprising a first one or more of subframes in which the sidelink UE is scheduled to transmit. The method generally includes determining a second one or more subframes, of the first one or more subframes, in which the sidelink UE has a generated packet to transmit. The method generally includes determining to skip transmission in one or more of the second subframes. The method generally includes listening during the one or more of the second subframes for a transmission from another sidelink UE. The method generally includes determining whether to reselect resources based on the listening.

Certain aspects of the subject matter described in this disclosure can be implemented in a method for wireless communication by a sidelink user equipment (UE). The method generally includes listening during a first subframe for a transmission from another sidelink UE. The method generally includes detecting based on the listening whether the transmission from the other sidelink UE collides with a scheduled transmission resource for the sidelink UE. The detecting is based on an amount of frequency resource overlap between the transmission from the other sidelink UE and the scheduled transmission resource for the sidelink UE. The method generally includes determining to reselect resources based on whether one or more collisions are detected.

Although aspects of the subject matter described in this disclosure involve a first sidelink UE and a second sidelink UE, the methods and apparatuses described herein may be applied to situations with any number of colliding UEs.

Aspects of the present disclosure provide means for, apparatus, processors, and computer-readable mediums for performing the methods described herein.

Aspects of the present disclosure provide means for, apparatus, processors, and computer-readable mediums for performing techniques and methods that may be complementary to the operations by the UE described herein, for example, by a BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
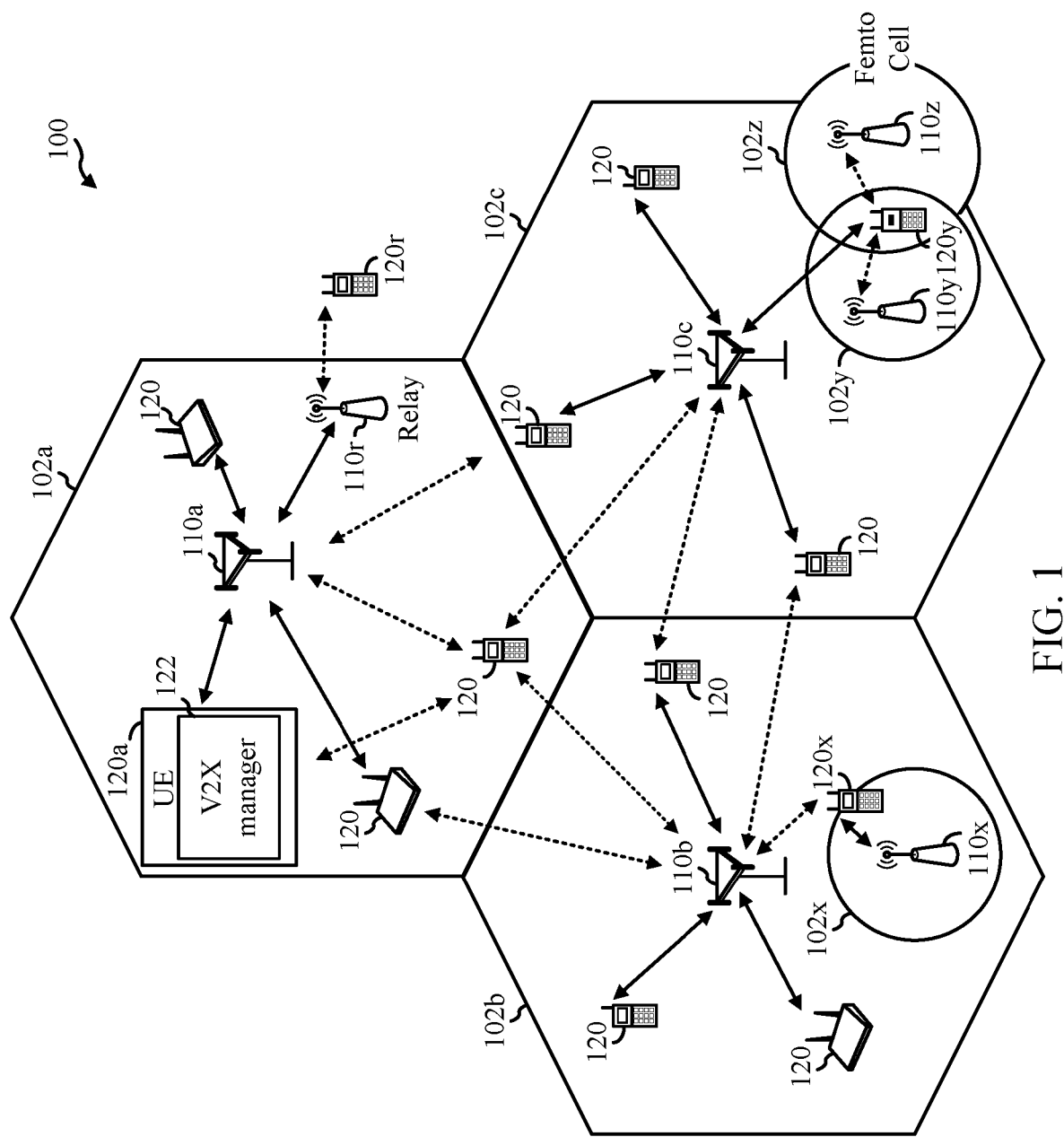
FIG. 1 is a block diagram conceptually illustrating an example wireless communication network, in accordance with certain aspects of the present disclosure.
Figure 1:
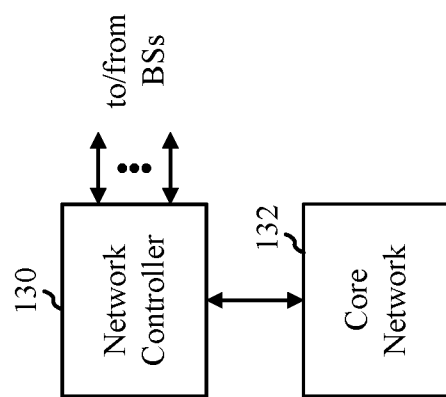

Aspects of the present disclosure provide apparatus, methods, processing systems, and computer readable mediums for packets collision mitigation in sidelink.

In some systems, such as certain cellular vehicle-to-anything (C-V2X) systems, half duplex (HD) operation may be used. Collisions may occur when devices transmit using the same resources. In addition, the resource may be semi-persistent scheduling (SPS) scheduling resources. Thus, techniques are needed to mitigate collisions. In some cases, a muting and one-shot transmission are used to listen for collisions and determine whether to reselect resources.

Aspects of the present disclosure provide improved techniques for congestion estimation, smarter muting and collision detection, and improved resource reselection.

The following description provides examples of packet collision mitigation in sidelink communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

According to certain aspects, the BSs 110 and UEs 120 may be configured for packets collision mitigation in sidelink. In some examples, the UEs 120 may be configured for C-V2X communications. As shown in FIG. 1, the UE 120a includes a V2X manager 112 that may be configured for collision mitigation, in accordance with aspects of the present disclosure.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
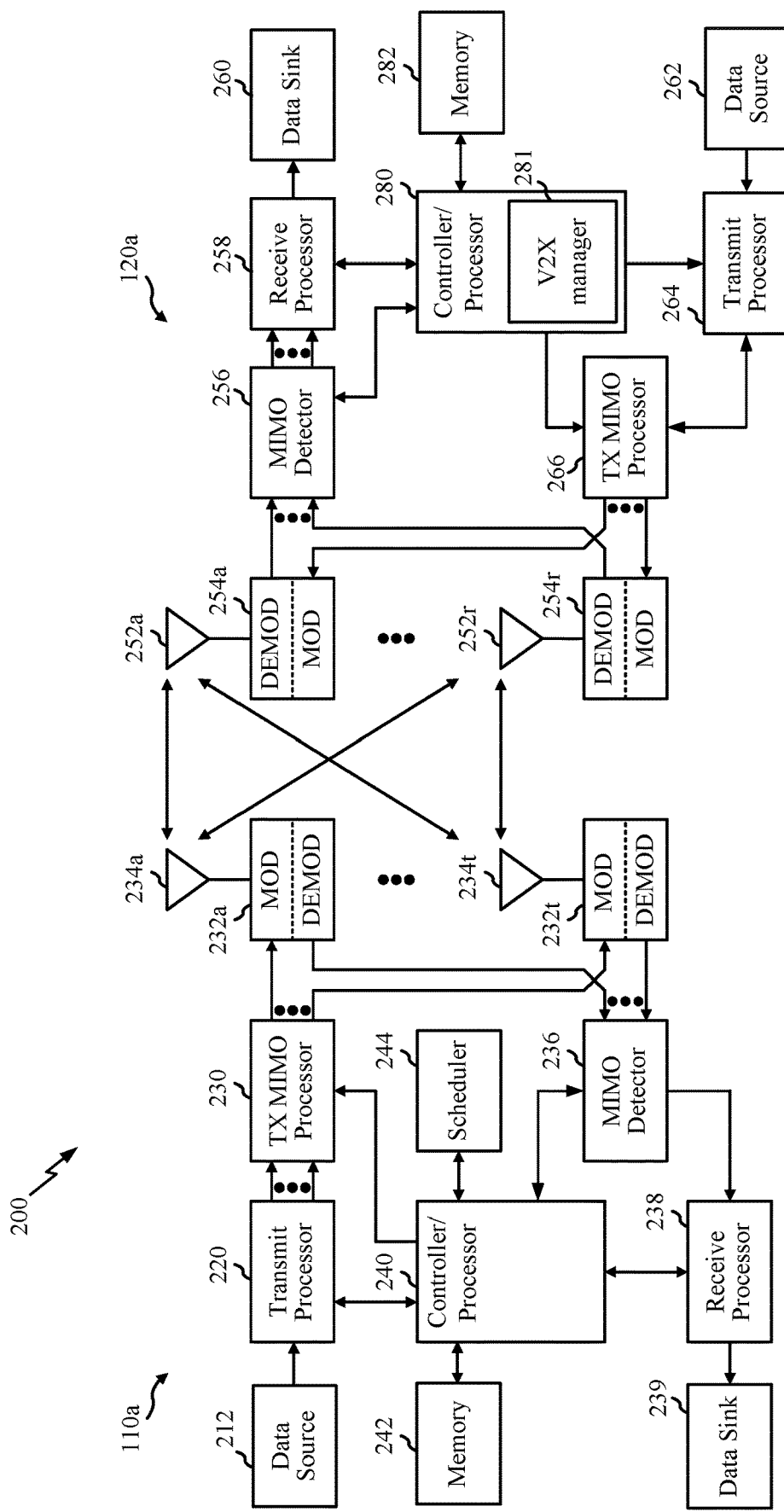
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. For example, as shown in FIG. 2, the controller/processor 280 of the UE 120*a* has a V2X manager 281 that may be configured for collision mitigation, according to aspects described herein. Although shown at the controller/processor, other components of the UE 120*a* and BS 110*a* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
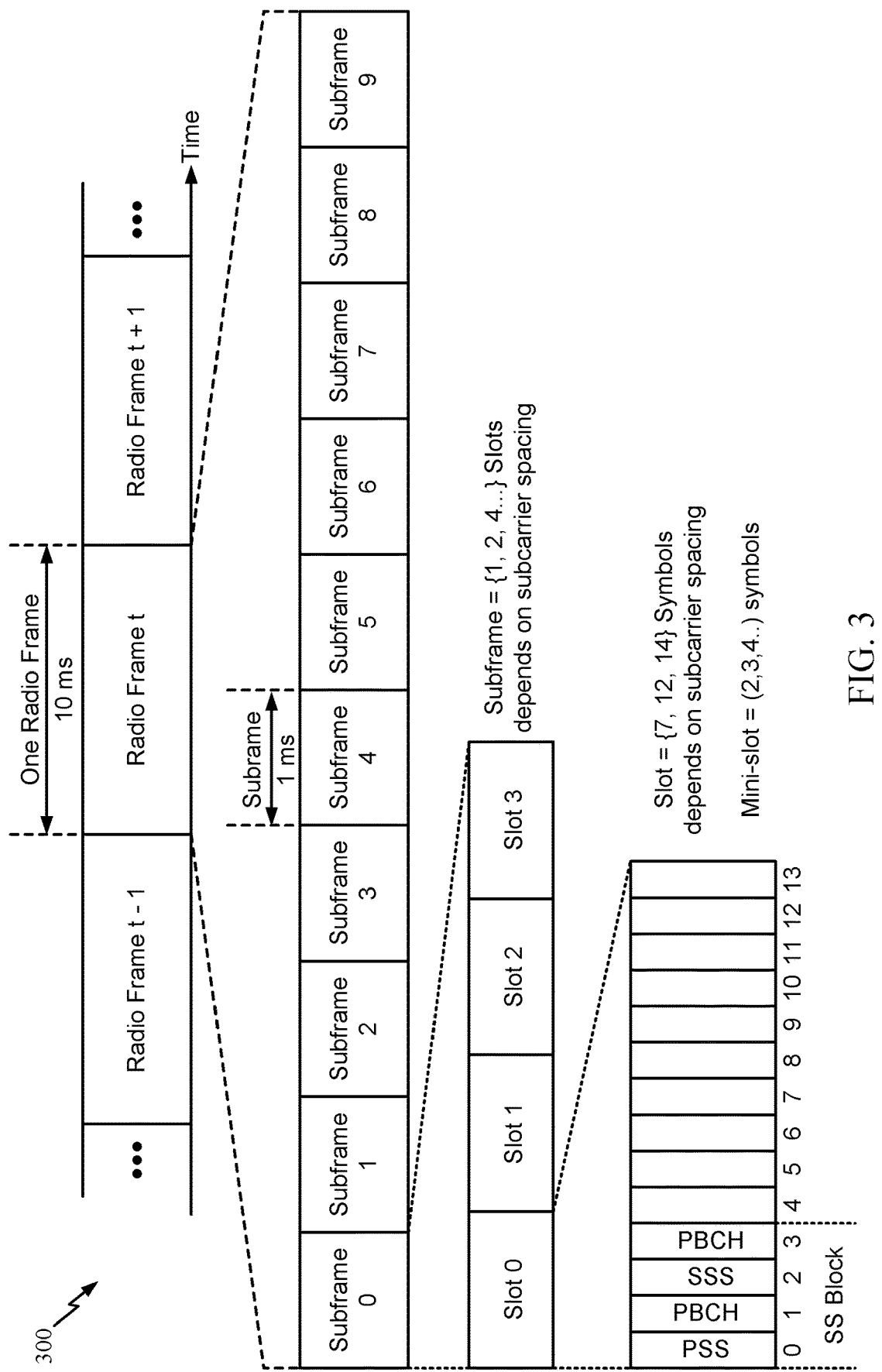
FIG. 3 is an example frame format for certain wireless communication systems, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120*a*) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Figure 4B:
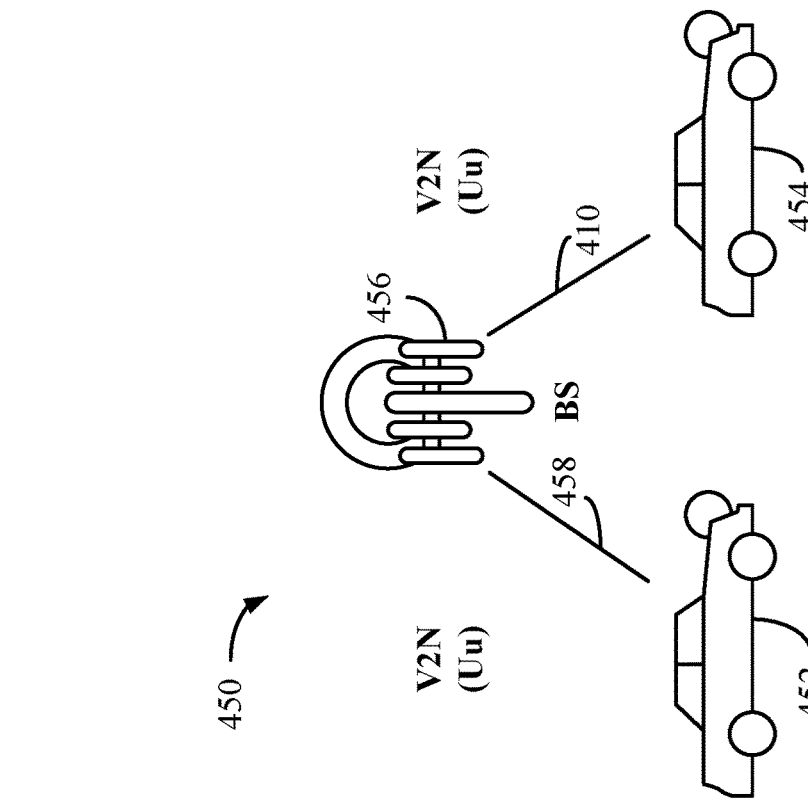
FIG. 4A and FIG. 4B show diagrammatic representations of example vehicle-to-anything (V2X) systems, in accordance with certain aspects of the present disclosure.
Figure 4A:
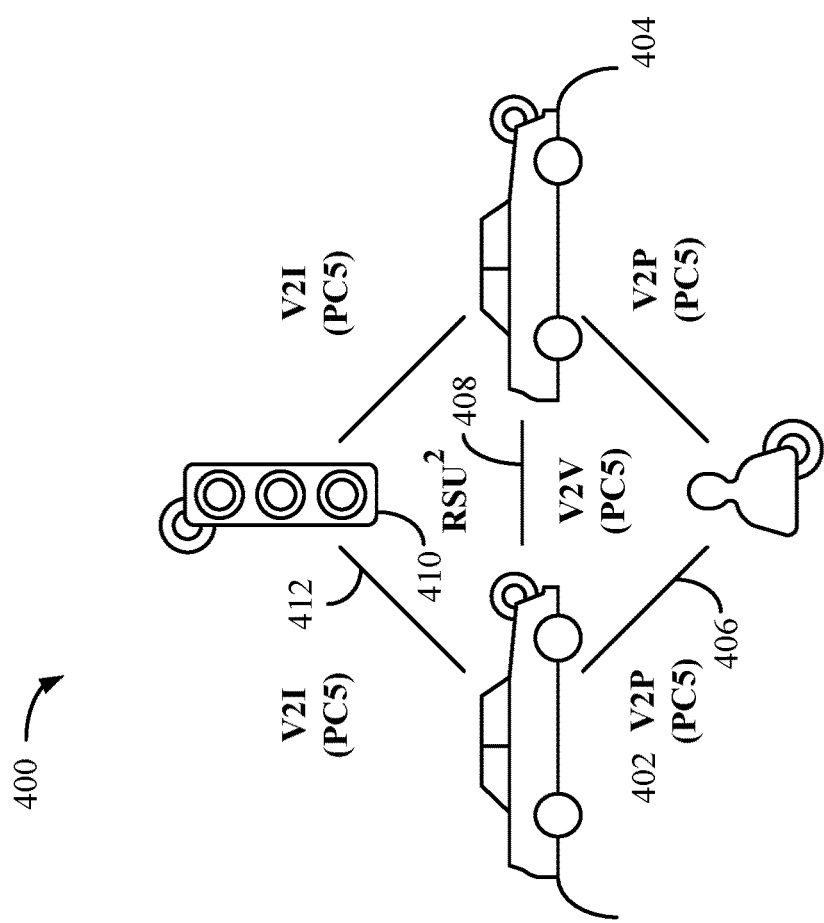

FIG. 4A and FIG. 4B show diagrammatic representations of example V2X systems, in accordance with some aspects of the present disclosure. For example, the vehicles shown in FIG. 4A and FIG. 4B may communicate via sidelink channels and may perform sidelink CSI reporting as described herein.

The V2X systems, provided in FIG. 4A and FIG. 4B provide two complementary transmission modes. A first transmission mode, shown by way of example in FIG. 4A, involves direct communications (for example, also referred to as side link communications) between participants in proximity to one another in a local area. A second transmission mode, shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., the BS 110a), that sends and receives information to and from (for example, relays information between) vehicles 452, 454. The network communications through vehicle to network (V2N) links 458 and 410 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QOS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Aspects of the disclosure relate to sidelink communications, such as cellular-vehicular-to-anything (C-V2X) communications. C-V2X is a unified connectivity platform designed to offer vehicles low-latency vehicle-to-vehicle (V2V), vehicle-to-roadside infrastructure (V2I) and vehicle-to-pedestrian (V2P) communication. C-V2X networks can operate without cellular infrastructure support. Vehicles can autonomously select their radio resources using the SPS algorithm specified by the Third Generation Partnership Project (3GPP).

In some examples, the 3GPP SPS algorithm involves the UE performing channel sensing and resource selection. The UE sensing considers resource exclusion, based on SPS packets, and selection of resource candidates, sorted by energy measurement during the channel sensing.

In the C-V2X sidelink Mode 4 communication, the sensing-based SPS implements a message collision avoidance algorithm to cope with the undesirable effects of wireless channel congestion. SPS reserves periodic transmit (Tx) resources (i.e., subframes or RBs) but keeps the Tx resources in a probabilistic manner. Therefore, the current standard mechanism produces a high number of packet collisions, which may hinder the high-reliability communications that may be desired for future C-V2X applications.

In addition, sidelink devices may be configured for half-duplex (HD) operation. In HD mode, a device cannot both Tx and receive (Rx) at the same time. Consequently, the device cannot receive from other UEs using the same Tx resources (e.g., in the same subframe) even if they transmit using different sub-channels. HD operation may limit the capacity to effectively support a large number of vehicles.

Networks, such as C-V2X networks, which implement both HD and SPS may produce some packet collisions. For example, collisions can happen every several minutes to several hours ($10^{-4}$~$10^{-5}$). The collisions may occur even in two UEs scenarios. These collisions can last several hundred milliseconds to several seconds long.

Figure 5:
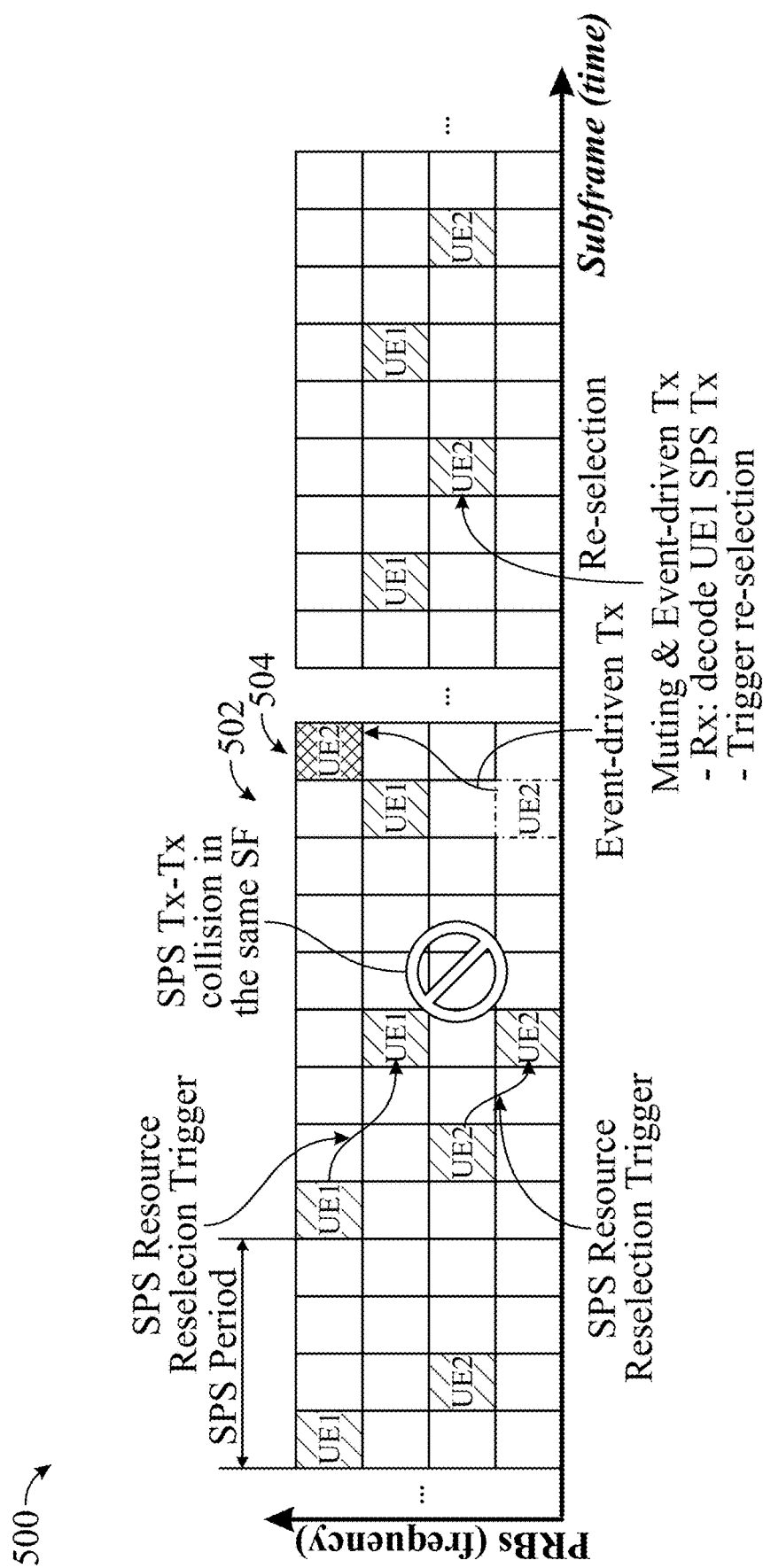
FIG. 5 illustrates example operations for muting, event-driven, one-shot transmission (Tx), and resource reselection, in accordance with certain aspects of the present disclosure.

In some cases, a muting, event-driven, one shot Tx, and resource reselection may be performed for some of the SPS reserved Tx resources to help avoid or reduce collisions, as shown in FIG. 5. For example, as shown in FIG. 5, a UE 1 and a UE 2 may have SPS resource reservations. The UEs may randomly, or semi-randomly, reselect the SPS resources based on sensing.

As used herein, the muting may refer to dropping, or refraining from transmitting. If the UEs reselect to a same subframe, then they may not be able to hear (e.g., or detect) the other's transmission (e.g., due to HD operation). The UEs may perform muting to detect transmission by the other UE. As shown in FIG. 5, the UE 2 mutes one of its SPS scheduled transmissions, in the subframe 502, to listen for transmission from the UE 1. The muting UE 2 can detect a collision through its Rx on the muted SPS Tx subframe and further decode the UE 1's packet transmission.

After the muting, the UE 2 may perform a one-shot transmission, for example in the next subframe 504, to transmit the transmission from the muted subframe. For example, the event-driven, one-shot transmission may be a transmission not using the SPS resources, but a one-time transmission after the muting.

When the UE 2 detects the transmission from the UE 1, the UE 2 may decide there is a collision in the SPS reservation and perform a re-selection of its SPS resources, as shown in FIG. 5. Thus, the collision with UE 1 may be avoided.

With muting, max inter-packet gap (IPG) is decreased; however, packet block error rate (BLER) may be increased. With one-shot transmission, the BLER can be improved. However, further improvements are desirable. In addition, if the collision is a resource-block (RB) level collision or a subframe level collision without RB overlap, other UEs may still be able to decode the colliding UEs transmission.

Accordingly, what is needed are techniques and apparatus for reducing packet collisions in sidelink, such as for reducing or avoiding SPS collisions in C-V2X systems.

Example Packet Collision Mitigation in Sidelink

Aspects of the present disclosure provide enhancements for packet collision mitigation in sidelink. For example, aspects of the present disclosure provide improved techniques for congestion estimation, smarter muting and collision detection, and improved resource reselection.

Although aspects of the subject matter described in this disclosure involve a first sidelink user equipment (UE) and a second sidelink UE, the methods and apparatuses described herein may be applied to situations with any number of colliding or potentially colliding devices.

Figure 6:
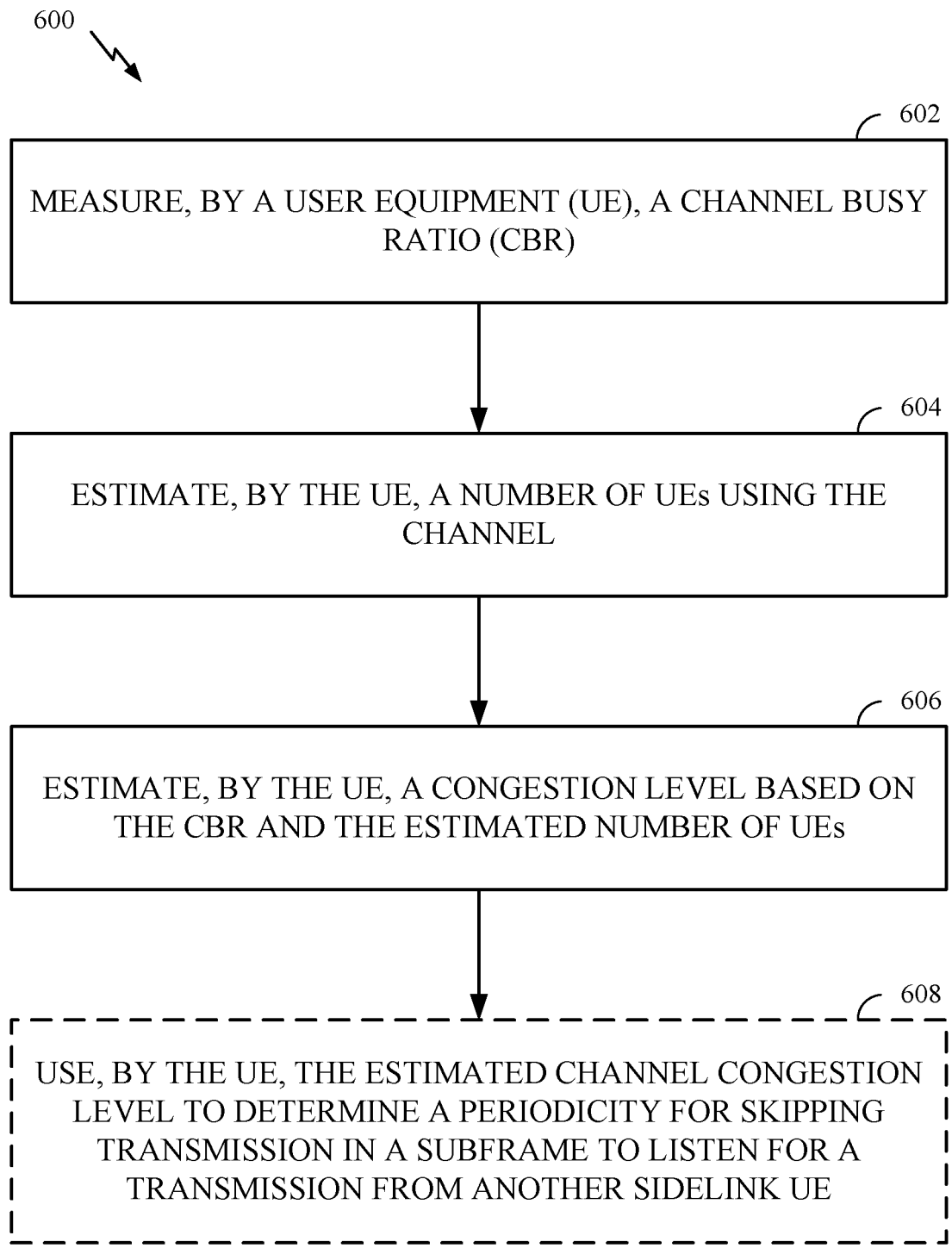
FIG. 6 is a flow diagram illustrating example operations for wireless communication by a UE, in accordance with certain aspects of the present disclosure.
Figure 7:
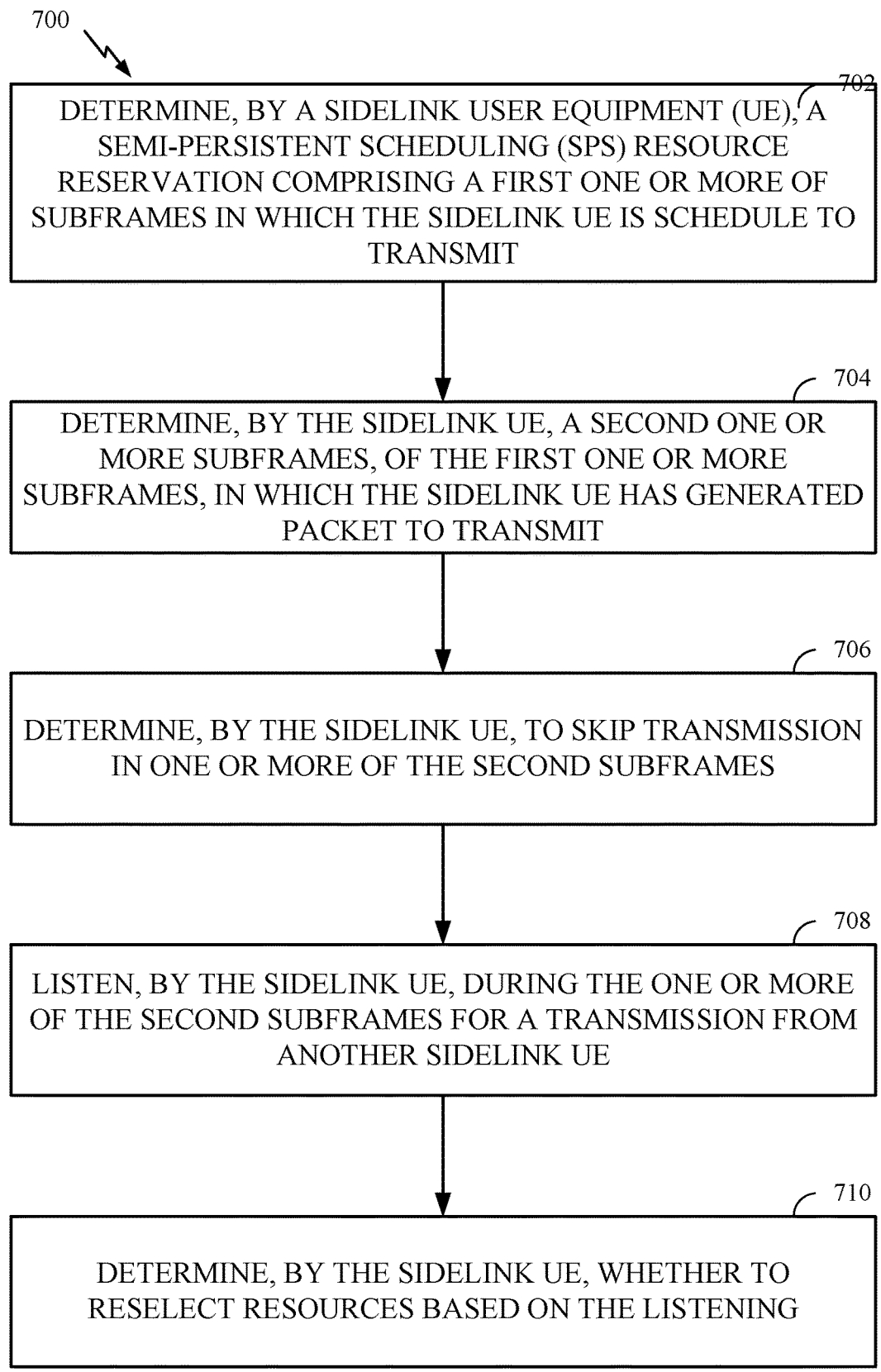
FIG. 7 is a flow diagram illustrating example operations for wireless communication by a first sidelink UE, in accordance with certain aspects of the present disclosure.
Figure 9:
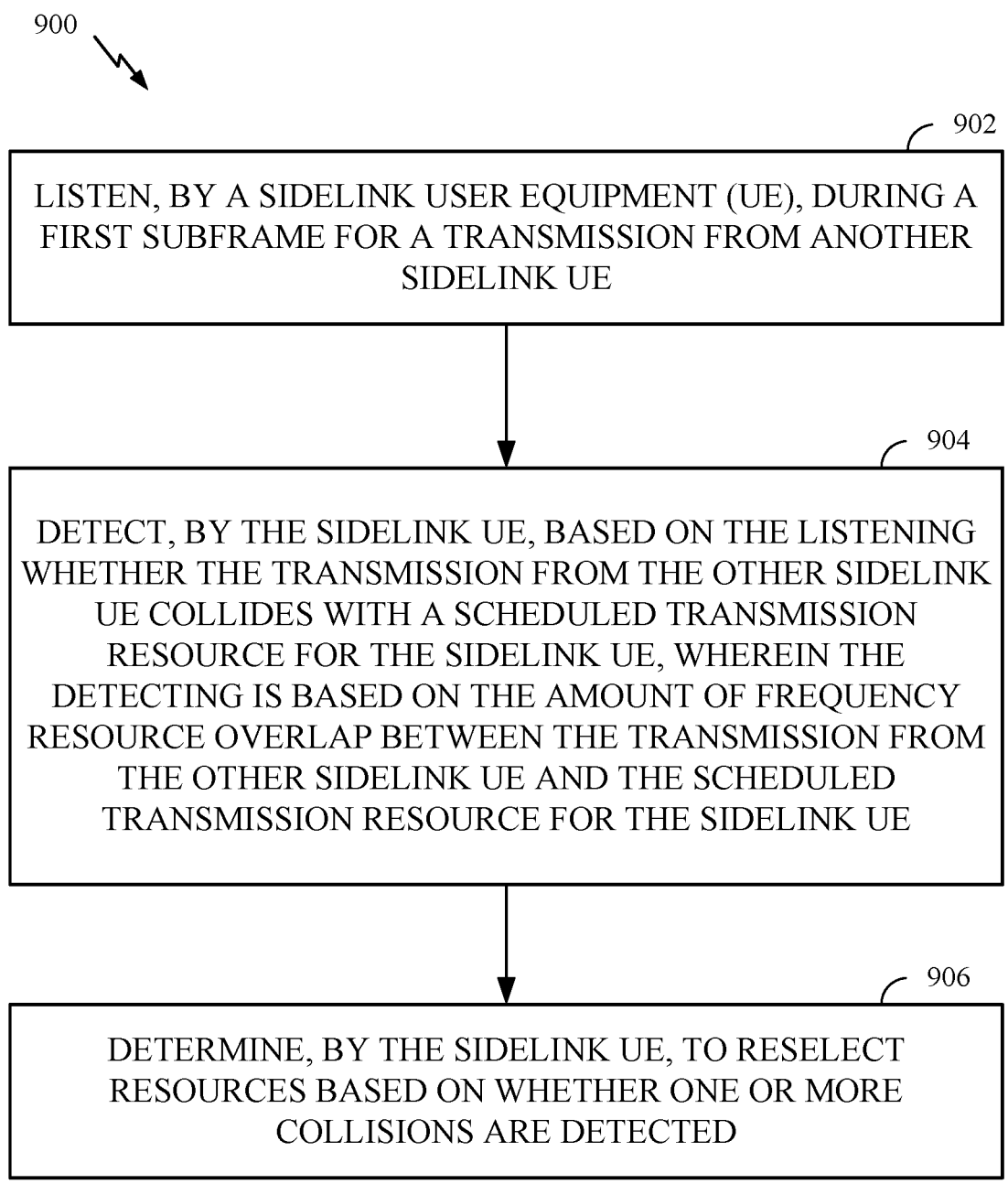
FIG. 9 is a flow diagram illustrating example operations for wireless communication by a first sidelink UE, in accordance with certain aspects of the present disclosure.

FIGS. 6, 7, and 9 are flow diagrams illustrating example operations 600, 700, and 900, respectively, for wireless communication, in accordance with certain aspects of the present disclosure. The operations 600, 700, and 900 may be performed, for example, by a user equipment (UE) (e.g., the UE 120a in the wireless communication network 100). The operations 600, 700, and 900 may be implemented as software components that are executed and run on one or more processors (e.g., controller/processor 280 of FIG. 2). Further, the transmission and reception of signals by the UE in operations 600, 700, and 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Example Congestion Level Estimation:

According to certain aspects, techniques are provided for improved congestion level estimation by taking into account the number of UEs in addition to channel busy ratio (CBR).

FIG. 6 is a flow diagram illustrating example operations 600 that may be performed by a sidelink UE for congestion level estimation.

The operations 600 may begin, at 602, by measuring a channel busy ratio (CBR).

At 604, the UE estimates a number of UEs using the channel. Estimating the number of UEs using the channel may include counting a number of packets received in a time window and estimating the number of UEs using the channel based on the number of packets. Estimating the number of UEs using the channel may include counting a number of source addresses in packets received in a time window and estimating the number of UEs using the channel based on the number of source addresses.

At 606, the UE estimates a congestion level based on the CBR and the estimated number of UEs.

The operations at 600 may further include, at 608, using the estimated channel congestion level to determine a periodicity for skipping transmission in a subframe to listen for a transmission from another sidelink UE.

Muting (e.g., as shown in FIG. 5) and C-V2X performance can depend on the congestion level. Accordingly, the congestion level can controls the frequency of the UE muting, event-driven one-shot Tx, and re-selection of the procedure illustrated in FIG. 5. In certain systems, only CBR is used for congestion level estimation; however, CBR measurement may be less relevant for C-V2X performance. In an illustrative example, a test case with 50 UEs may have a CBR less than 10%, whereas a test case with only 8 UEs may have a CBR more than 10%. Although the CBR is expected to be higher for a greater number of UEs present, the CBR value for the 10 UEs is lower than the test case with only 8 UEs present. Thus, improved techniques for congestion level estimation in C-V2X are desirable.

Accordingly, aspects of the present invention estimate congestion level of C-V2X at the modem by considering the estimated number of UEs in addition to the CBR. To estimate the number of UEs using the channel, the UE can count a number of packets, and/or the number of packet resource blocks (RBs), received by the UE within a time window (e.g., in a 1 second time window). In some examples, the UE estimate the number of UEs using the channel by counting a number of source addresses (e.g., layer 2 source addresses) received by the UE in a time window (e.g., in a 1 second time window). The UE can then estimate the congestion level taking into account the number of UEs using the channel in addition to the CBR. The CBR may be determined by channel sensing.

The estimated congestion level may then be used to determine the muting, one-shot Tx, and reselection. For example, the frequency (or periodicity) that the UE performs the muting process may be determined, at least in part, based on the estimated congestion level.

Example Smart Muting for Irregular SPS Tx:

According to certain aspects, smart muting may be used. For example, the smart muting may account for irregular SPS transmissions.

FIG. 7 is a flow diagram illustrating example operations 700 that may be performed by a sidelink UE for smart muting in irregular SPS Tx.

The operations 700 may begin, at 702, by the sidelink UE, determining a SPS resource reservation including a first one or more of subframes in which the sidelink UE is scheduled to transmit.

At 704, the sidelink UE determines a second one or more subframes, of the first one or more subframes, in which the sidelink UE has a generated packet to transmit. In some examples, determining a second one or more subframes in which the sidelink UE has a generated packet to transmit includes randomly selecting a first candidate subframe to skip transmission, and when there is no generated packet to transmit in the first candidate subframe, waiting until a number of subframes in which the sidelink UE actually transmits, and determining the second one or more subframes based on the subframes in which the sidelink UE actually transmits. In some examples, determining a second one or more subframes in which the UE has a generated packet to transmit includes randomly selecting a first candidate subframe to skip transmission, and when there is no generated packet to transmit in the first candidate subframe, waiting until a next subframe in which the sidelink UE actually transmits, and determining the next subframe as one of the second one or more subframes.

At 706, the sidelink UE determines to skip transmission in one or more of the second subframes.

At 708, the sidelink UE listens during the one or more of the second subframes for a transmission from another sidelink UE. After listening in the one or more second subframe, the sidelink UE may send the skipped transmission in the following subframe.

At 710, first sidelink UE determines whether to reselect resources based on the listening.

The sidelink UE in the operations of 700 may be a vehicular UE.

SPS resources may have a periodic reservation. In an illustrative example, SPS Tx is reserved every 100 milliseconds (ms). However, the actual SPS Tx packets may be irregular. For example, although the reservation is every 100 ms, the UE may actual generate an SPS Tx (e.g., packet) every 100 ms to 600 ms. The irregular SPS Tx from applications may be due to distributed congestion control, decentralized congestion control (DCC) used in intelligent transport systems (ITS), jittering, or the like. If muting does not consider actual SPS Tx, SPS collision detection may not align with the actual SPS Tx. In this case, even if the UE detects a transmission from another UE in the muting subframe, there would not actually be a collision because the UE does not actually transmit in that subframe.

Accordingly, aspects of the present invention provide for smarter muting decisions by the UE to skip/mute transmission by considering/counting actual packet Tx (e.g., instead of the SPS scheduled transmissions only).

Figure 8:
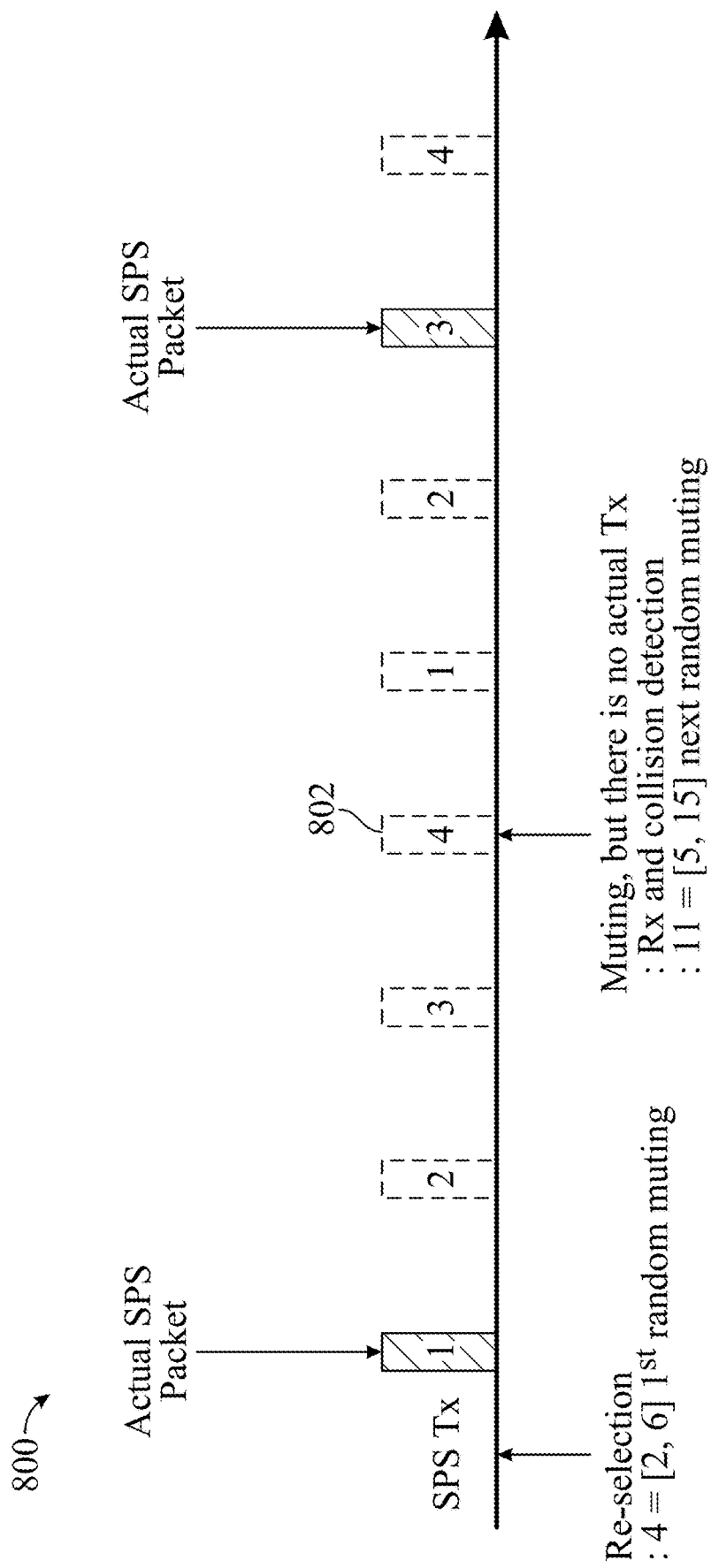
FIG. 8 illustrates example operations for considering actual packet transmission to enhance muting in irregular semi-persistent scheduling (SPS), in accordance with certain aspects of the present disclosure.

In some examples, the UE considers actual SPS transmission. For example, the UE randomly select a muting subframe. In some examples, the UE performs the random muting after an SPS resource (re) selection. As shown in FIG. 8, the UE has an actual SPS packet transmission at subframe 1 and subframe 3 (seven subframes after subframe 1). The UE randomly selects a subframe between the actual SPS transmissions (e.g., among the subframes [2, 6]), such as the subframe 802 (e.g., subframe 4).

In some examples, the randomly selected subframe (e.g., subframe 802) has no actual SPS Tx. After random selection, if there is no actual SPS Tx for the random selection, muting may be applied to the next actual SPS Tx packet.

In the example in FIG. 8, the UE may perform the random muting at subframe 802. If there is no actual transmission, the UE may randomly select, for example, among subframes [5, 15]. For example, in the example in FIG. 8, the UE selects subframe 11 for its next random muting.

Once the UE mutes in a subframe with an actual generated packet Tx, the UE can perform the collision detection, one-shot transmission, and decide whether to perform resource reselection.

Example SPS Collision Detection:

According to certain aspects, SPS collision detection/reselection determination may be improved. For example, collision may be detected (e.g., resource reselection is determined) based on an amount of RB level overlap in transmission resources by the UEs. The collision detection/reselection determination may be based on a priority associated with the transmissions. The collision detection/reselection determination may be based on a range and/or signal strength difference of the transmissions. The collision detection/reselection determination may be based on tracking of flows.

FIG. 9 is a flow diagram illustrating example operations 900 that may be performed by a sidelink UE for SPS collision detection.

The operations 900 may begin, at 902, by the sidelink UE listening during a first subframe for a transmission from another sidelink UE. In some examples, the first subframe includes a subframe in which the sidelink UE transmits or a subframe in which the sidelink UE skips transmission based on jittering or muting. In some examples, where the first subframe is a subframe in which the sidelink UE skips transmission based on muting, after listening in the one or more second subframes, the sidelink UE sends the skipped transmission in the following subframe.

At 904, the sidelink UE detects based on the listening whether the transmission from the other sidelink UE collides with a scheduled transmission resource for the sidelink UE. The detecting is based on an amount of frequency resource overlap between the transmission from the other sidelink UE and the scheduled transmission resource for the sidelink UE. In some examples, detecting includes detecting a collision when the transmission from the other sidelink UE and the scheduled transmission resource for the sidelink UE occur in the subframe. The transmission from the other sidelink UE and the scheduled transmission resource for the sidelink UE are on non-overlapping frequency resources. In some examples, detecting includes detecting a collision when the transmission from the other sidelink UE and the scheduled transmission resource for the sidelink UE are on at least partially overlapping frequency resources. In some examples, detecting includes detecting a collision when the frequency resources for one of the transmission from the other sidelink UE and the scheduled transmission resource for the sidelink UE fully overlaps the frequency resources of the other.

In some examples, detecting based on the listening whether the transmission from the other sidelink UE collides with a scheduled transmission resource for the sidelink UE is further based on periodicities associated with the transmission from the other sidelink UE and the scheduled transmission resource for the sidelink UE. The detecting may include detecting a collision when the difference between the periodicities is larger than a threshold.

At 906, the sidelink UE determines to reselect resources based on whether one or more collisions are detected. Determining to reselect resources based on whether one or more collisions are detected may include determining to reselect resources when at least a single collision is detected when the scheduled transmission is a non-hybrid automatic repeat request (HARQ) transmission, when a channel congestion level is below a threshold, or both and determining to reselect resources when multiple collisions are detected when the scheduled transmission is a HARQ transmission, when the channel congestion level is above a threshold, or both. In some examples, determining to reselect resources is based on a distance of the other sidelink UE from the sidelink UE, a signal strength of the transmission from the other sidelink UE, a congestion level, or a combination thereof.

The sidelink UE in the operations of 900 may be a vehicular UE.

The operations at 900 may further include determining a periodicity for skipping transmission in a subframe to listen for a transmission from another sidelink UE, detecting collision, reselecting resources, or a combination thereof, based on a semi-persistent scheduling (SPS) flow priority associated with the scheduled transmission.

The operations at 900 may further include reselecting resources for the scheduled transmission, detecting one or more expected SPS flows are not detected after the reselection, and triggering skipping transmission and listening in another subframe based on detecting the one or more expected SPS flows are not detected.

Figure 10:
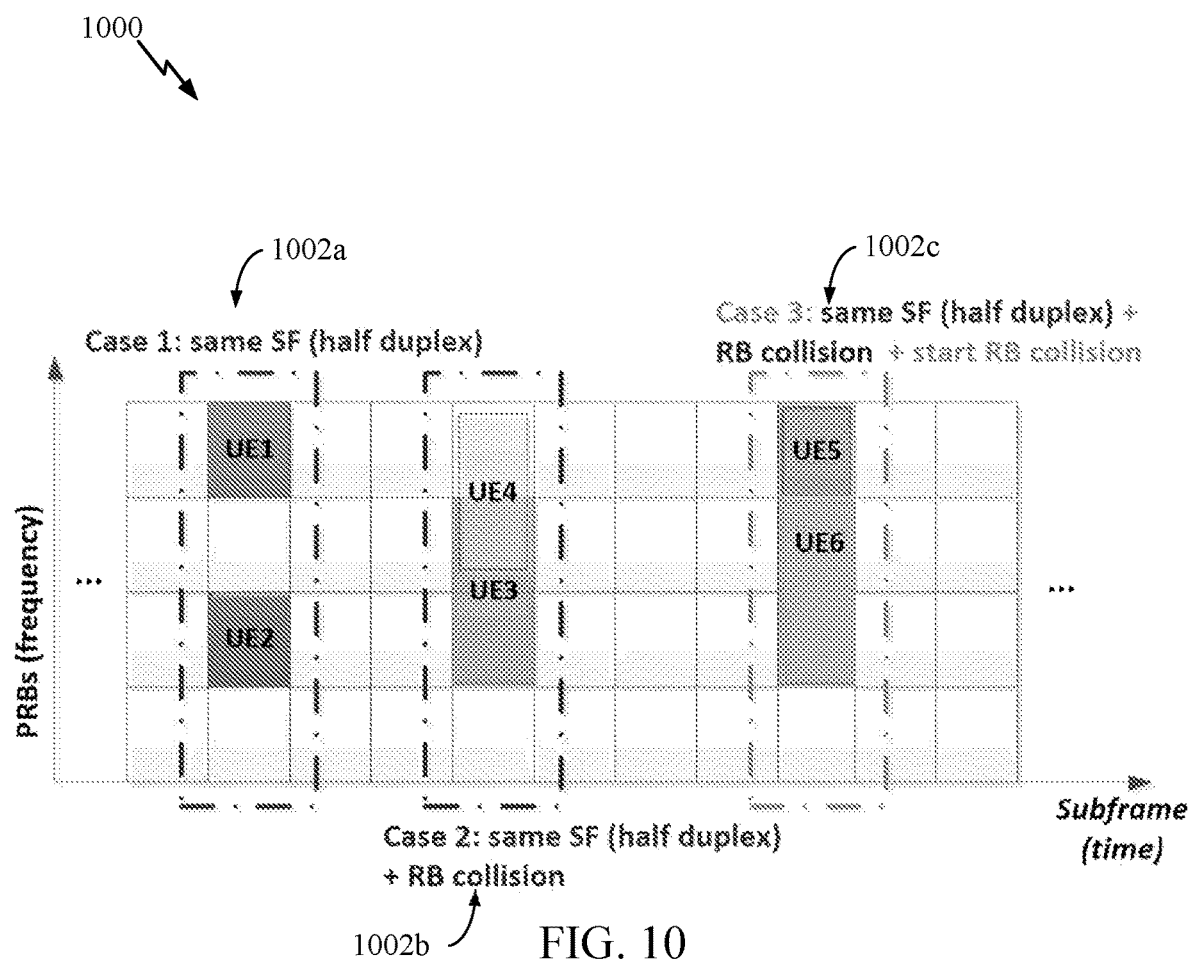
FIG. 10 illustrates three cases of SPS collision detection, in accordance with certain aspects of the present disclosure.

According to certain aspects, there may be various cases of overlap/collision between transmissions (e.g., detected during the muting/listening subframe). FIG. 10 illustrates three cases of SPS collision detection in 3 different subframes, 1002*a*, 1002*b*, and 1002*c*, in accordance with certain aspects of the present disclosure.

In some examples, a collision is detected for any time-domain overlap irrespective of any frequency-domain collision occurring. Thus, a collision may be detected when transmission occur in the subframe, even if the transmissions use different frequency resources, as shown in subframe 1002*a*. Under half-duplex (HD) operation, the subframe colliding UEs may not be able to receive each other's (e.g., UE 1 cannot hear or detect UE 2 at subframe 1002*a* and UE 2 cannot hear or detect UE 1 at subframe 1002*a*), but other UEs can receive the colliding UEs.

In some examples, a collision is detected for transmissions in the same subframe that use partially overlapping frequency-domain resources. As the control information may be located at the beginning of the transmission with data, the partial overlap between the transmissions overlaps the control portion of one of the transmissions. Specifically, the collision occurs when $(RB_{Tx\text{-}start}+LRB_{TX})>RB_{RX\text{-}start}$ and $RB_{TX\text{-}Start}<(RB_{RX\text{-}start}+LRB_{RX})$. As used herein, $RB_{start}$ is the index of the starting RB of the packet and LRB is the number of packet RBs. As shown in the subframe 1002b, UE 3 and UE 4 transmit in the same subframe with a partial RB-level collision. In this case, other UEs may or may not receive the colliding UEs transmissions (e.g., UE 3 colliding with UE 4). For example, because the control portion of the UE 3 transmission is overlapped, other UEs may not be able to receive the transmission from UE 3.

In some examples, a collision is detected for transmissions in the same subframe that use fully overlapping frequency-domain resources. As the control information may be located at the beginning of the transmission with data, the full overlap between the transmissions overlaps the control portion of both transmissions. The collision detected in subframe 1002c involves a start RB collision wherein time and frequency domains collide. Specifically, the collision occurs when $RB_{Tx\text{-}start}=RB_{Rx\text{-}start}$. As shown in subframe 1002c the transmissions of UE 5 and UE 6 in the same subframe involving a RB collision and a start RB collision. In this case, other UEs may not receive transmissions from either of the colliding UEs (e.g., UE 5 colliding with UE 6), for example, because the control portions of both are overlapped.

Thus, the detection of a collision/determination to perform resource reselection may be based not only the detection of the transmissions in the subframe, but also on the amount of frequency (e.g., RB-level) overlap of the transmissions.

According to certain aspects of the present disclosure, the detection of a collision/determination to perform resource reselection may be based further on other conditions. For example, the detection of a collision/determination to perform resource reselection may be based on whether the transmissions use hybrid automatic repeat request (HARQ) and/or based on the congestion level. For example, because with HARQ retransmissions there will be more opportunities for the successful decoding of the transmissions, the conditions for resource reselection may be stricter, while without HARQ retransmissions, the conditions for resource reselection may be relaxed-so the UE is more likely to reselect resources to ensure that the transmission will be received.

Automatic Repeat Request (ARQ) is a method for enhancing communication performance through retransmission of data received in error. HARQ can include combined ARQ and/or Forward Error Correction (FEC) techniques that save failed decoding attempts for future joint decoding. In C-V2X HARQ, the UE can transmit HARQ retransmission blindly without any ACK/NACK messages from the receivers.

In some examples, where the transmissions is a subframe-level collision (e.g., time-domain collision without frequency-domain collision as illustrated at subframe 1002a), the UE may reselect resources based on whether the transmission is a HARQ transmission. For example, for non-HARQ transmissions, the UE may detect a collision/determine to reselect resource when the transmission resources are in the same subframe. For HARQ transmissions, the UE may detect a collision/determine to reselect resources when the transmissions are in the same subframe and further based on whether there is one colliding transmission or multiple colliding transmissions in the subframe. For example, for the HARQ transmissions, the UE may detect a collision/determine to reselect resources based on single or double collisions further based on a congestion level threshold (e.g., a CBR threshold). When the congestion level is at or below the threshold, the UE may use single collision detection, and the UE may use double collision when congestion level is above the threshold.

In accordance with certain aspects of the present disclosure, where the collision is a start RB-to-start RB collision (e.g., fully overlapping, as illustrated at subframe 1002b), reselection of resources may be determined based on whether the scheduled transmission is a HARQ transmission. For non-HARQ transmissions, the UE can detect collision/determine to reselect resources when there is a start RB collision (full overlap) with another transmission or only when there are multiple start RB collisions with other transmissions. For example, for HARQ transmissions, the UE can detect collision/determine to reselect resources when there is a single RB collision (full overlap) with another transmission and the congestion level is at or below a threshold, while the UE only detects collision/determines to reselect resources when are there are multiple start RB collisions when the congestion level is above the threshold.

In accordance with certain aspects of the present disclosure, where the collision involves any RB-level collision (e.g., partially overlapping, as illustrated at subframe 1002b), reselection of resources may be determined based on whether the scheduled transmission is a HARQ transmission. For non-HARQ transmissions, the UE can detect collision/determine to reselect resources there is single RB-level collision (e.g., any partial overlap) with another transmission. For HARQ retransmission, the UE can detect collision/determine to reselect resources when there is a single RB-level collision conditions or only when there are multiple RB-level collisions with other transmissions. For example, the UE can detect collision/determine to reselect resources when there is any RB-level collision with a transmission when the congestion level is at or below a threshold, while the UE can detect collision/determine to reselect resources only when there are multiple RB-level collisions with other transmissions when the congestion level is above the threshold.

In some examples, subframe collision conditions, start RB collision conditions, and RB-level collision conditions can be used together. For example, when the congestion level is at or below a threshold, the subframe collision conditions (e.g., no frequency overlap) may be used for SPS collision detection/resource reselection. When the congestion level is above the threshold, start RB collision (full frequency overlap) or RB-level collision (partial overlap) may be used for SPS collision detection/resource reselection.

According to certain aspects of the present disclosure, the listening and collision detection techniques applied above can be implemented in other subframes beyond a muting subframe. For example, SPS Tx-Tx collision detection and resource reselection may be enabled for any Rx subframe. For example, the UE can listen (e.g., detect, decode) transmissions from other UEs in a subframe in which the UE skips transmission due to jittering, a subframe in which the UE skips transmission based on muting, or any other Rx subframe.

According to certain aspects of the present disclosure, the collision detection/resource reselection may further be based on a periodicity associated with the transmissions involved in the collision. In some examples, a 20, 50, 100, 200, ..., 1000 ms SPS periods (or other period) may be used for the SPS transmissions. The periodicity associated with the SPS transmissions may be indicated in the control channels of the transmissions. In some examples, when one of the transmissions has a large SPS Tx periods and the other transmission has a small SPS period (e.g., when the difference between the periods is larger or exceeds a threshold), then the UE may be more likely to triggering reselection than when the transmissions have a similar period. In some examples, when any of the SPS periods for the transmissions in a subframe is large, the UE may be more likely to trigger reselection than when none of the SPS periods is large.

According to certain aspects of the present disclosure, the muting/skipping, event-driven one-shot Tx, collision detection, and resource reselection may further be based on a priority associated with the transmissions in a subframe (e.g., based on the SPS flow priority). Priority-based SPS collision mitigation can control the level of protection afforded in collision detection based on the associated priority. The 3GPP Specification identifies 8 different scheduling priorities (1~8) which are assigned to each data flow in SPS. The priority flow associated with each SPS may be indicated in the transmission's control channel.

In considering flow priority, more protection may be given to a high SPS flow priority associated with the scheduled transmission. In some examples, more frequent muting/skipping and event-driven Tx and/or more frequent reselection (e.g., more relaxed collision detection/resource reselection conditions) may be used for higher priority flows than for lower priority flows. For example, high priority SPS flows may trigger a single start RB or single subframe collision condition, while low priority SPS flows may trigger a multiple start RB or multiple subframe collision condition. In another example, the flow priority may considered in addition to congestion level. In some examples, only when the congestion level above a threshold, reselection may be triggered for SPS flows with a priority below a threshold.

According to certain aspects of the present disclosure, the collision detection/resource reselection may further be based on the distance (e.g., range) between the UEs, a signal strength of the transmissions, and/or a congestion level. In some examples, under high congestion levels (e.g., when the congestion level is above a threshold), collision avoidance or resource reselection may be biased for UEs (e.g., vehicles) that are near (e.g., within a distance at or below a threshold range and/or a signal strength above a threshold). For example, the resource reselection may be biased by making the resource reselection more likely (e.g., the conditions relaxed for detecting a collision/determining to reselect resources) when the congestion level is above a threshold and the distance is at or below a threshold or the signal strength is above a threshold. The distance between a first sidelink UE and a second sidelink UE may be detected based on safety messages which may include location information, while signal strength may be received/measured by a modem. The modem may determine, for example, a received signal strength indicator (RSSI) or a reference signal received power (RSRP). In some embodiments, when the congestion level is high and an SPS collision is detected, resource re-selection will be triggered when the RSRP or RSSI is greater than a threshold.

Figure 11:
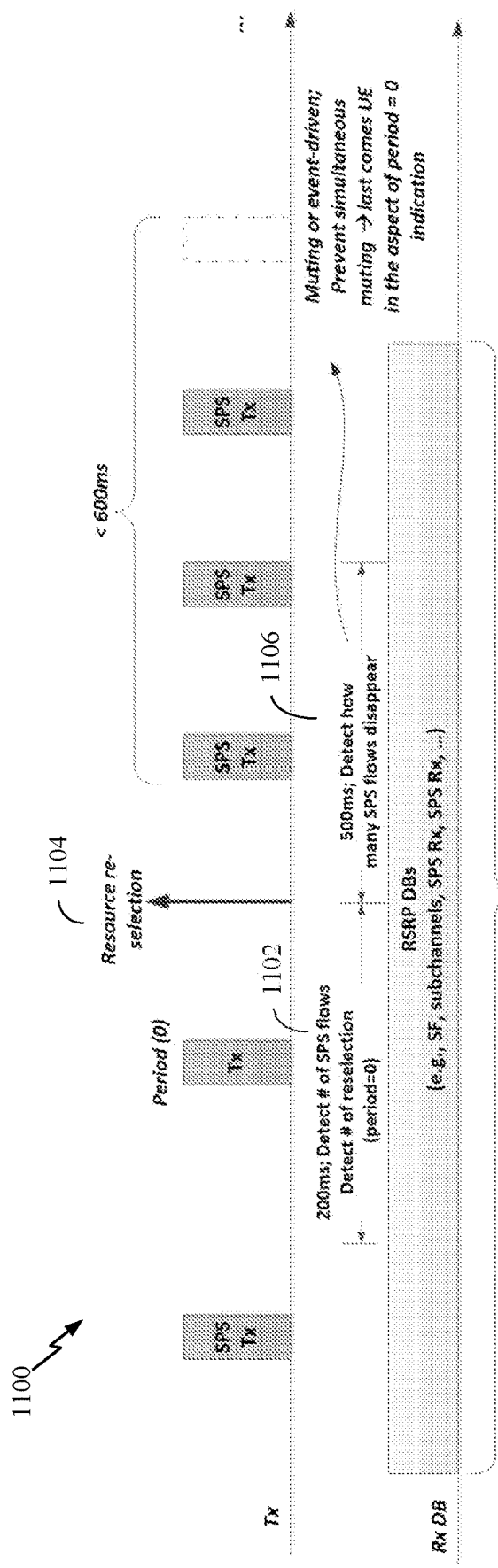
FIG. 11 illustrates example operations for smarter muting selection and event-driven, one-shot Tx in SPS collisions, in accordance with certain aspects of the present disclosure.

FIG. 11 illustrates smarter muting selection and event-driven, one-shot Tx for SPS collisions, in accordance with certain aspects of the present disclosure. According to certain aspects, the muting, one-shot transmission, and reselection can be triggered based on tracking of received SPS flows. In some examples, the number of SPS flows received during a first window may be tracked by a UE and then compared to the number of SPS flows received after reselection, during a second window by the same UE. If the UE detects some of the SPS flows have disappeared (e.g., a number of SPS flows received previously in the first window are not received in the second window), the muting and event-driven, one-shot Tx may be triggered. As shown in an illustrative example in FIG. 11, the UE detects the number of SPS flows during a 200 ms window 1102. After resource reselection 1104, the UE detects the number of SPS flows which have disappeared in a 500 ms window, 1106. Muting or even-driven Tx is triggered when the UE detects that a number of the SPS flows have disappeared in the 500 ms window.

Figure 12:
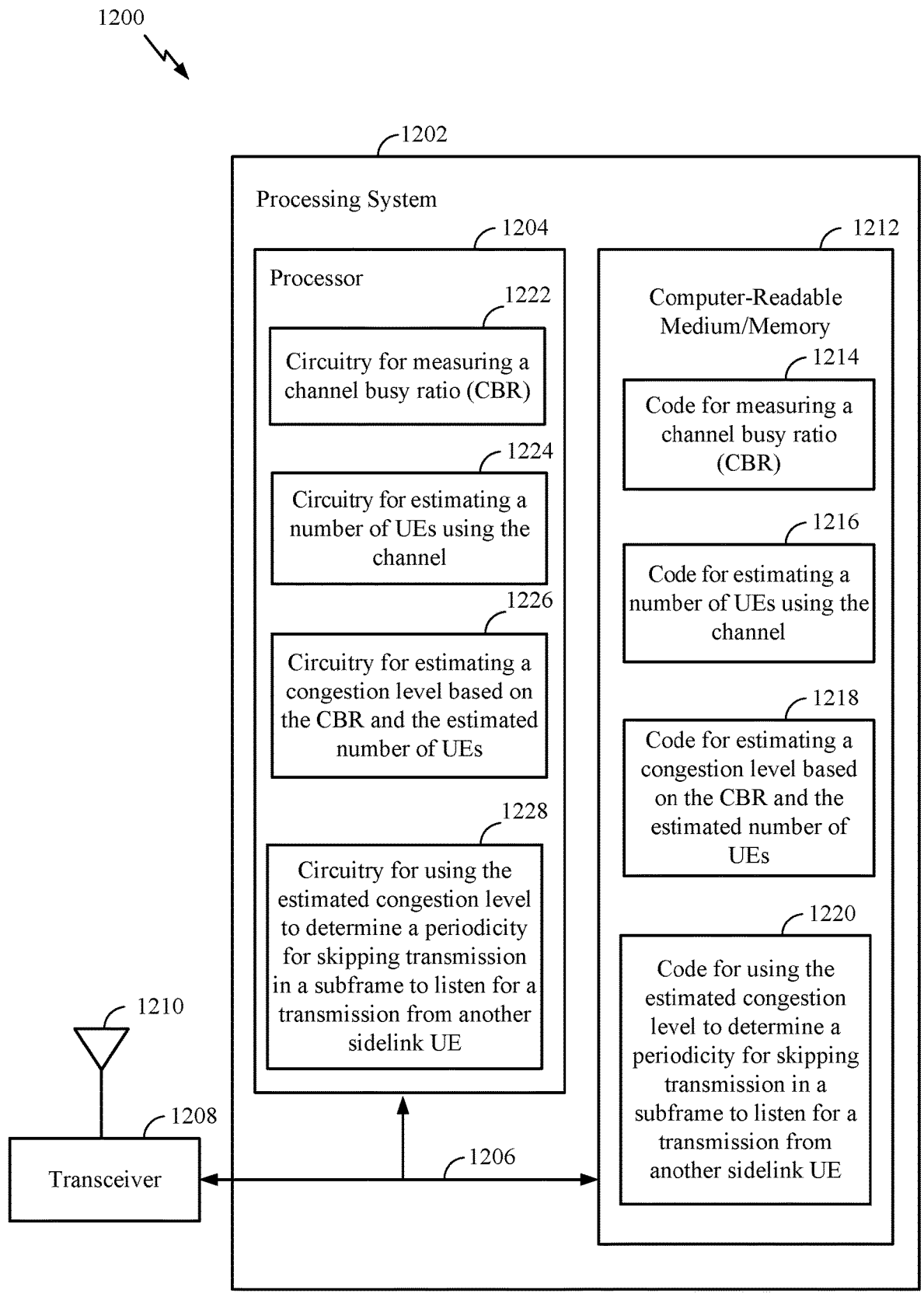
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 6. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 6, or other operations for performing the various techniques discussed herein for enhancements of C-V2X UE-to-UE packets collision mitigation. In certain aspects, computer-readable medium/memory 1212 stores code 1214 for measuring a channel busy ratio (CBR); code 1216 for estimating a number of UEs using the channel; code 1218 for estimating a congestion level based on the CBR and the estimated number of UEs; and/or code 1220 for using the estimated channel congestion level to determine a periodicity for skipping transmission in a subframe to listen for a transmission from another sidelink UE, in accordance with aspects of the disclosure. In certain aspects, the processor 1204 has circuitry configured to implement the code stored in the computer-readable medium/memory 1212. The processor 1204 includes circuitry 1222 for measuring a channel busy ratio (CBR); circuitry 1224 for estimating a number of UEs using the channel; circuitry 1226 for estimating a congestion level based on the CBR and the estimated number of UEs; and/or circuitry 1228 for using the estimated channel congestion level to determine a periodicity for skipping transmission in a subframe to listen for a transmission from another sidelink UE, in accordance with aspects of the disclosure.

Figure 13:
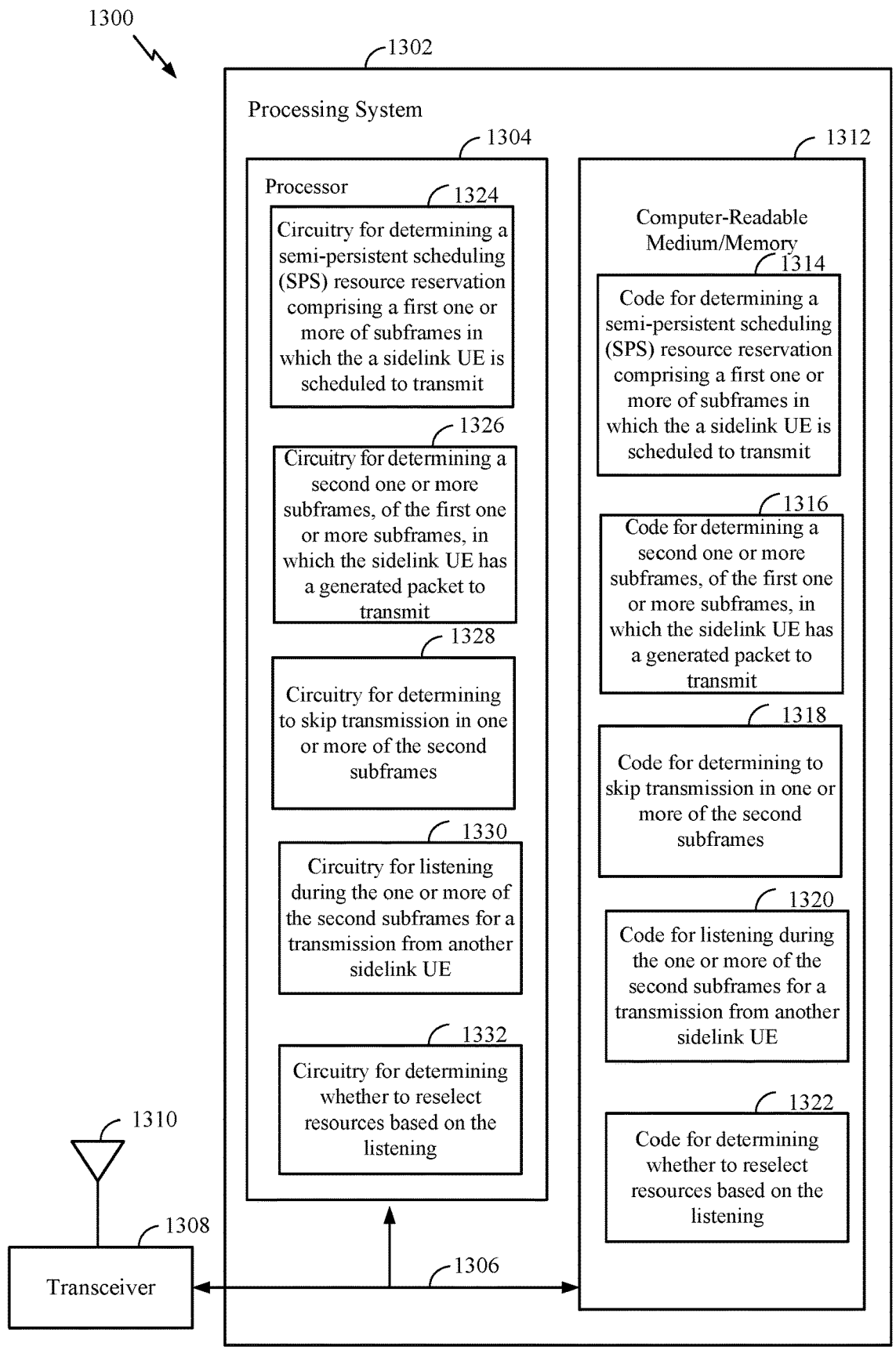
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 7. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 7, or other operations for performing the various techniques discussed herein for enhancements of C-V2X UE-to-UE packets collision mitigation. In certain aspects, computer-readable medium/memory 1312 stores code 1314 for determining a semi-persistent scheduling (SPS) resource reservation comprising a first one or more of subframes in which the sidelink UE is scheduled to transmit; code 1316 for determining a second one or more subframes, of the first one or more subframes, in which the sidelink UE has a generated packet to transmit; code 1318 for determining to skip transmission in one or more of the second subframes; code 1320 for listening during the one or more of the second subframes for a transmission from another sidelink UE; and/or code 1322 for determining whether to reselect resources based on the listening, in accordance with aspects of the disclosure. In certain aspects, the processor 1304 has circuitry configured to implement the code stored in the computer-readable medium/memory 1312. The processor 1304 includes circuitry 1324 for determining a semi-persistent scheduling (SPS) resource reservation comprising a first one or more of subframes in which the UE is scheduled to transmit; circuitry 1326 for determining a second one or more subframes, of the first one or more subframes, in which the UE has a generated packet to transmit; circuitry 1328 for determining to skip transmission in one or more of the second subframes; circuitry 1330 for listening during the one or more of the second subframes for a transmission from another sidelink UE; and/or circuitry 1332 for determining whether to reselect resources based on the listening, in accordance with aspects of the disclosure.

Figure 14:
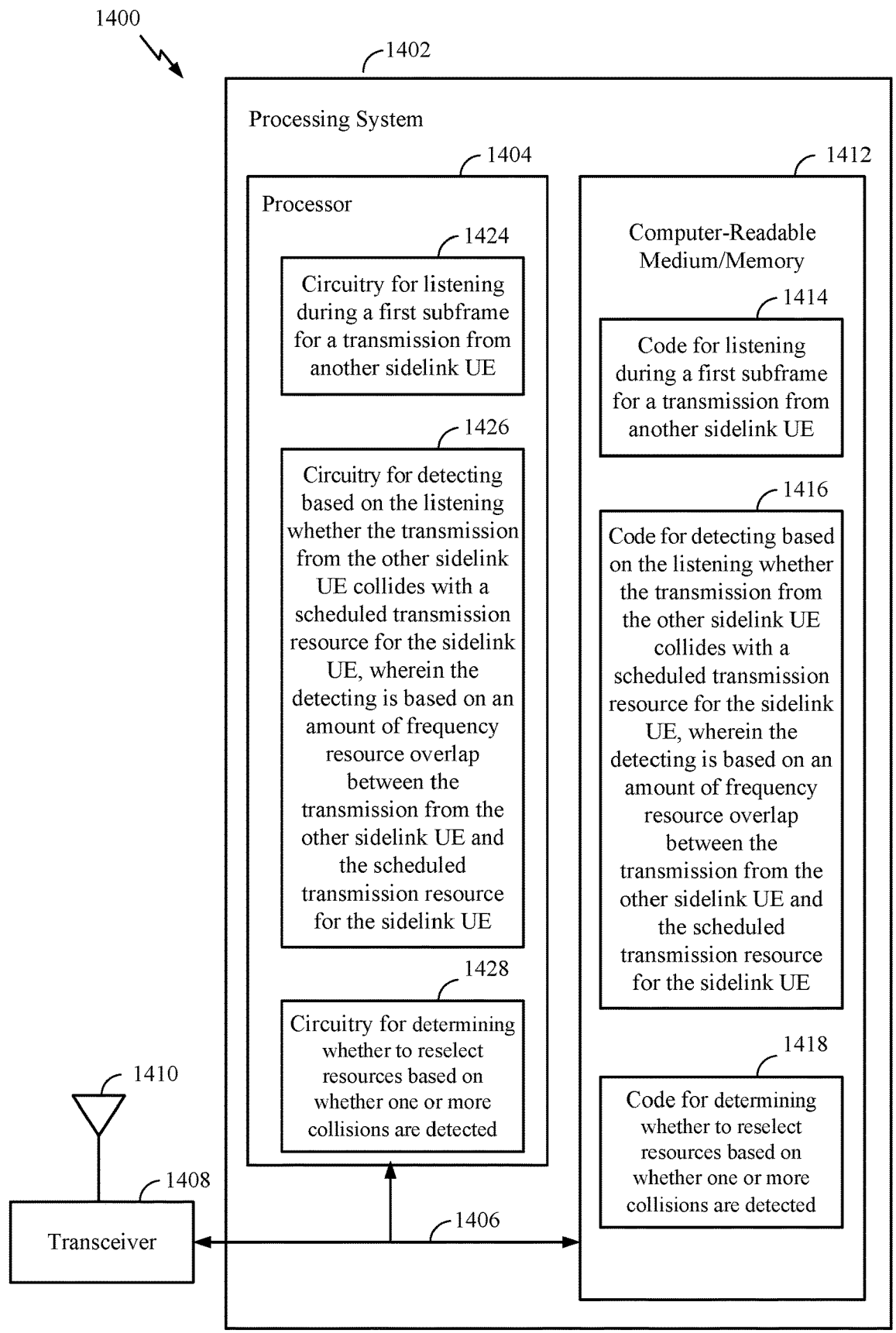
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 9. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 9, or other operations for performing the various techniques discussed herein for enhancements of C-V2X UE-to-UE packets collision mitigation. In certain aspects, computer-readable medium/memory 1412 stores code 1414 for listening during a first subframe for a transmission from another sidelink UE; code 1416 detecting based on the listening whether the transmission from the other sidelink UE collides with a scheduled transmission resource for the sidelink UE, wherein the detecting is based on an amount of frequency resource overlap between the transmission from the other sidelink UE and the scheduled transmission resource for the sidelink UE; and/or code 1418 for determining to reselect resources based on whether one or more collisions are detected, in accordance with aspects of the disclosure. In certain aspects, the processor 1404 has circuitry configured to implement the code stored in the computer-readable medium/memory 1412. The processor 1404 includes circuitry 1424 listening during a first subframe for a transmission from another sidelink UE; circuitry 1426 for detecting based on the listening whether the transmission from the other sidelink UE collides with a scheduled transmission resource for the sidelink UE, wherein the detecting is based on an amount of frequency resource overlap between the transmission from the other sidelink UE and the scheduled transmission resource for the sidelink UE; and/or circuitry 1428 for determining to reselect resources based on whether one or more collisions are detected, in accordance with aspects of the disclosure.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6, FIG. 7, and/or FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a first user equipment (UE), comprising:
    determining a semi-persistent scheduling (SPS) resource reservation comprising a first set of subframes in which the first UE is scheduled to transmit a sidelink transmission;
    determining to skip transmission in a subset of subframes of the first set of subframes;
    listening during at least one subframe of the subset of the subframes for a transmission from a second UE;
    based on the listening:
        measuring a channel busy ratio (CBR) of a channel;
        estimating a number of UEs using the channel; and
        estimating a congestion level of the channel based on the CBR and the number of UEs; and triggering an SPS resource reselection based on the congestion level.

2. The method of claim 1, wherein the estimating the number of UEs using the channel comprises:
counting a number of packets received in the at least one subframe; and
estimating the number of UEs using the channel based on the number of packets.

3. The method of claim 1, wherein the estimating the number of UEs using the channel comprises:
counting a number of source addresses in packets received in the at least one subframe; and
estimating the number of UEs using the channel based on the number of source addresses.

4. The method of claim 1, further comprising determining a periodicity for skipping transmission in a subset of subframes of a reselected set of subframes to listen for a transmission from a sidelink UE, wherein the determining is based on the congestion level.

5. The method of claim 1, further comprising:
in response to determining the first UE does not have a packet to transmit in the at least one subframe:
skipping transmission in a next subframe of the first set of subframes in which the first UE has a packet to transmit; and
listening during the next subframe for a transmission from the second UE.

6. The method of claim 1, wherein the first UE comprises a vehicular UE.

7. The method of claim 1, further comprising sending the skipped transmission in a subframe subsequent the at least one subframe and different than the first set of subframes.

8. The method of claim 5, further comprising determining the subset of subframes to skip transmission, wherein the determining comprises:
randomly selecting the at least one subframe to skip transmission; and
determining one or more other subframes to skip transmission based on the first UE not having a packet to transmit in the at least one subframe and the first UE having a packet to transmit in the subsequent subframe.

9. The method of claim 1, further comprising detecting, based on the listening, the transmission from the second UE collides with a scheduled SPS resource for the first UE in the at least one subframe, wherein the detecting the collision is based on an amount of frequency resource overlap between the transmission from the second UE and the scheduled SPS resource reservation for the first UE in the at least one subframe, wherein the triggering the SPS resource reselection is further based on an amount of the detecting the collision.

10. The method of claim 9, wherein the detecting the collision comprises detecting the transmission from the second UE collides with the scheduled SPS resource for the first UE in response to detecting that the transmission from the second UE and the scheduled SPS resource for the first UE occur in the same subframe.

11. The method of claim 10, wherein the transmission from the second UE and the scheduled SPS resource reservation for the first UE are on non-overlapping frequency resources in the same subframe.

12. The method of claim 9, wherein the detecting the collision comprises detecting the transmission from the second UE collides with the scheduled SPS resource for the first UE in response to detecting that the transmission from the second UE and the scheduled SPS resource for the first UE are on at least partially overlapping frequency resources in the same subframe.

13. The method of claim 9, wherein the detecting the collision comprises detecting the transmission from the second UE collides with the scheduled SPS resource for the first UE in response to detecting that the frequency resources for one of the transmission from the second UE and the scheduled SPS resource reservation for the first UE fully overlaps the frequency resources of the other.

14. The method of claim 1, wherein the triggering the SPS resource reselection comprises:
triggering the SPS resource reselection in response to determining that at least a single collision is detected when a scheduled SPS transmission is a non-hybrid automatic repeat request (HARQ) transmission, when the congestion level is below a threshold, or both; and
triggering the SPS resource reselection in response to determining that multiple collisions are detected when the scheduled SPS transmission is a HARQ transmission, when the congestion level is at or above the threshold, or both.

15. The method of claim 1, wherein the at least one subframe comprises a subframe in which the first UE skips transmission based on jittering or muting.

16. The method of claim 1, wherein the triggering the SPS resource selection is further based on a first SPS periodicity associated with the transmission from the second UE, a second SPS periodicity associated with the scheduled SPS resource reservation for the first UE, or a combination thereof.

17. The method of claim 16, wherein the triggering the SPS resource reselection comprises triggering the SPS resource reselection when at least one of the first periodicity or the second periodicity is larger than a threshold.

18. The method of claim 1, further comprising determining the subset of subframes to skip transmission, wherein at least one of:
determining the subset of subframes to skip comprises determining a periodicity for skipping transmission based on an SPS flow priority associated with the scheduled SPS resource reservation;
the triggering the SPS resource reselection is further based on the SPS flow priority; or a combination thereof.

19. The method of claim 1, wherein the triggering the SPS resource reselection is further based on a distance of the second UE from the first UE, a signal strength of the transmission from the second UE, or a combination thereof.

20. The method of claim 1, further comprising:
performing the SPS resource reselection;
detecting that one or more expected SPS flows are not detected during a time window after the reselection, wherein the one or more expected SPS flows comprise SPS flows that were detected by the first UE before the reselection; and
triggering skipping transmission, collision detection, and retransmission of the skipped transmission based on the detecting that the one or more expected SPS flows are not detected.

21. The method of claim 1, wherein the triggering the SPS resource reselection comprises:
triggering the SPS resource reselection in response to determining that at least a single collision with a starting resource block (RB) of a scheduled SPS resource is detected when a scheduled SPS transmission is a non-hybrid automatic repeat request (HARQ) transmission, when the congestion level is below a threshold, or both; and triggering the SPS resource reselection in response to determining that multiple collisions with the starting RB of the scheduled SPS resource are detected when the scheduled SPS transmission is a HARQ transmission, when the congestion level is at or above the threshold, or both.

22. The method of claim 1, wherein the triggering the SPS resource reselection comprises:

triggering the SPS resource reselection in response to determining that at least a single collision with any resource block (RB) of a scheduled SPS resource is detected when a scheduled SPS transmission is a non-hybrid automatic repeat request (HARQ) transmission, when the congestion level is below a threshold, or both; and triggering the SPS resource reselection in response to determining that multiple collisions with any RBs of the scheduled SPS resource are detected when the scheduled SPS transmission is a HARQ transmission, when the congestion level is at or above the threshold, or both.

23. The method of claim 1, wherein the triggering the SPS resource selection is further based on subframe-level collision detection when the CBR is below a threshold, and wherein the triggering the SPS resource selection is further based on a starting resource block (RB) level collision detection or any RB-level collision detection when the CBR is at or above the threshold.

24. A first apparatus for wireless communications, the first apparatus comprising:

memory storing computer-executable code; and at least one processor configured to, individually or collectively, execute the computer-executable code to cause the apparatus to:

determine a semi-persistent scheduling (SPS) resource reservation comprising a first set of subframes in which the first apparatus is scheduled to transmit a sidelink transmission;

determine to skip transmission in a subset of subframes of the first set of subframes;

listen during at least one subframe of the subset of the subframes for a transmission from a second apparatus;

based on the listening:

measure a channel busy ratio (CBR) of a channel;

estimate a number of apparatuses using the channel; and estimate a congestion level of the channel based on the CBR and the number of apparatuses; and trigger an SPS resource reselection based on the congestion level.

25. The first apparatus of claim 24, wherein the estimating the number of apparatuses using the channel comprises:

counting a number of packets received in the at least one subframe; and estimating the number of apparatuses using the channel based on the number of packets.

26. The first apparatus of claim 24, wherein the estimating the number of apparatuses using the channel comprises:

counting a number of source addresses in packets received in the at least one subframe; and estimating the number of apparatuses using the channel based on the number of source addresses.

27. The first apparatus of claim 24, wherein the at least one processor is further configured to execute the computer-executable code to cause the apparatus to determine, based on the congestion level, a periodicity for skipping transmission in a subset of subframes of a reselected set of subframes to listen for a transmission from a UE.

* * * * *